United States Patent [19]

Petersen

[11] 4,072,278
[45] Feb. 7, 1978

[54] DROP CORD REEL

[76] Inventor: Leo D. Petersen, 515 S. Grant Ave., Pocatello, Idaho 83201

[21] Appl. No.: 743,407

[22] Filed: Nov. 19, 1976

[51] Int. Cl.² .................. B65H 75/40; B65H 75/28
[52] U.S. Cl. ............................ 242/96; 191/12.2 R; 242/85; 242/100.1
[58] Field of Search ............... 242/54 R, 96, 99, 100, 242/100.1, 100.2, 107.1, 84, 84.1, 84.1 J, 85; 191/12.2 R

[56] References Cited

U.S. PATENT DOCUMENTS

| D. 194,753 | 3/1963 | Haller | 242/96 |
|---|---|---|---|
| 1,301,189 | 4/1919 | Steen | 242/96 |
| 2,047,705 | 7/1936 | Porter | 242/99 |
| 2,678,779 | 5/1954 | Bellmer | 242/107.1 |
| 3,880,378 | 4/1975 | Ballenger | 242/96 |

Primary Examiner—George F. Mautz
Attorney, Agent, or Firm—Clarence A. O'Brien; Harvey B. Jacobson

[57] ABSTRACT

A drop cord reel having a spool assembly including a spool rotatable by a knob connected to the spool along an axis offset from the axis of rotation of the spool for winding and unwinding a cord attached to a winding surface of the spool. Also included in the spool assembly is a U-shaped framework, one leg of which framework forms a spindle that receives the spool, and the outer leg of which forms a carrying handle for the reel. Mounted on the handle forming leg of the framework is a loop arrangeable for selectively engaging the knob and locking the spool against rotation.

5 Claims, 4 Drawing Figures

DROP CORD REEL

BACKGROUND OF THE INVENTION

1. Field of the Invention

This invention relates generally to reels for winding and unwinding cords and other longitudinally extending, flexible members, and particularly to a cord reel for facilitating handling of an electrical drop cord, and the like.

2. Description of the Prior Art

It is generally known to provide reels for electrical cords and similar flexible members which permits each half of the cord to be wound and unwound from the reel either simultaneously with or independently of the winding and unwinding of the other of the portions of the cord. Examples of such winding devices can be found in U.S. Pat. Nos: 438,779, issued Oct. 21, 1890, to S. O. Newton et al; 451,996, issued May 12, 1891, to W. E. Dow; 972,222, issued Oct. 11, 1910, to W. L. Paul; 1,186,131, issued June 6, 1916, to D. B. Replogle; and 1,270,257, issued June 25, 1918, to C. A. Boyer.

SUMMARY OF THE INVENTION

It is an object of the present invention to provide a cord reel suitable for manual manipulation in order to facilitate transporting the cord from one site to another as required by plumbers, electricians, and repairmen who have need of a drop cord in various locations and from different power sources.

It is another object of the present invention to provide a cord reel of economical construction which provides improved ease of handling and/or storing of a cord when compared to known cord reels.

It is yet another object of the present invention to provide a cord reel which keeps a cord free of knots and kinks commonly encountered when a cord is coiled in the conventional manner.

It is a still further object of the present invention to provide a cord reel which permits the cord to be rolled in either direction by right or left handed persons, with only the length of cord needed for a particular job required to be unrolled from the reel.

These and other objects are achieved according to the present invention by providing a cord reel having: a spool assembly including a spool rotatably mounted for winding and unwinding an associated cord; a rotating arrangement in the form of a knob connected to the spool assembly at a location offset from the axis of rotation of the spool for rotating the spool as the knob is orbited; and a latch arrangement provided on the spool assembly for selectively engaging the knob and preventing rotation of the spool by the knob.

The spool assembly advantageously includes, in addition to the spool, a substantially U-shaped framework comprising a pair of substantially parallel legs joined together by a side portion of the framework. The spool is mounted on a one of the legs which forms a spindle for the spool, while the other of the legs forms a handle arranged for facilitating carrying and manipulation of the cord reel. The latch arrangement preferably includes a loop attached to the leg of the framework which forms a carrying handle so as to selectively engage with the knob for preventing rotation of the spool.

The spool assembly further includes a winding surface provided on the spool and terminating in and extending between spaced ends of the spool. Plates, preferably in the form of disks, are mounted on the spool at the ends thereof, with the knob provided for rotating the spool being mounted on one of the plates in such a position as to have the plate form a crank connecting the knob to the axis of rotation of the spool. A suitable attaching bracket can be provided for fastening the longitudinal center of the cord to the winding surface of the spool.

The spool assembly also advantageously further includes guides overlapping the disks attached to the ends of the spool and themselves attached to the leg of the framework which forms a carrying handle for the reel in order to prevent the cord from rolling over the peripheral portions of the plates when an exceptionally long cord is employed.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENTS

Figure 1:
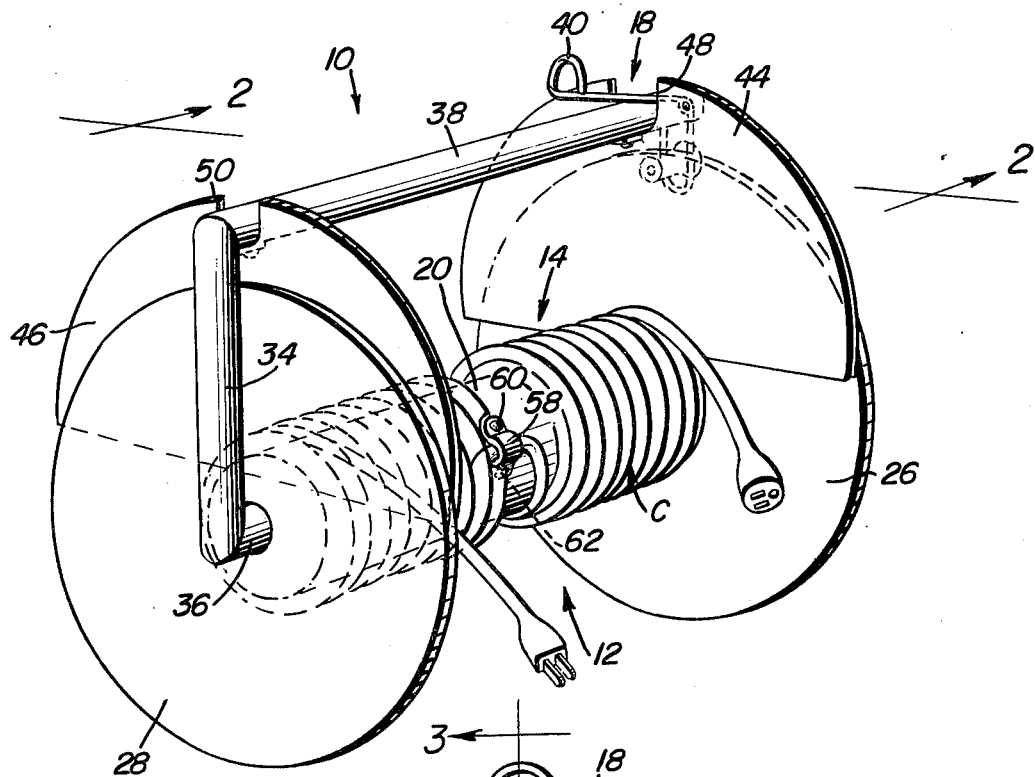
FIG. 1 is a perspective view showing a cord reel according to the present invention.
Figure 2:
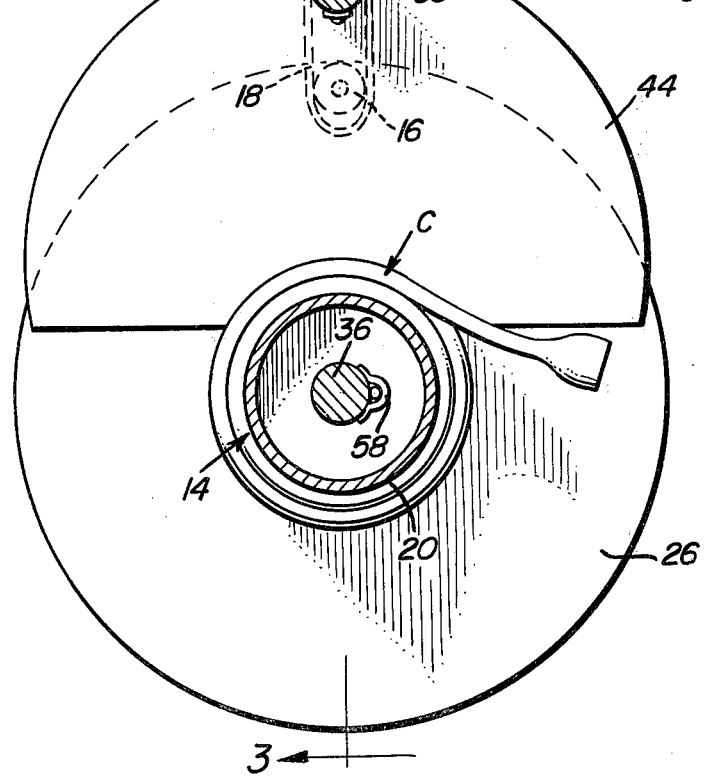
FIG. 2 is an enlarged, sectional view taken generally along the line 2—2 of FIG. 1.
Figure 3:
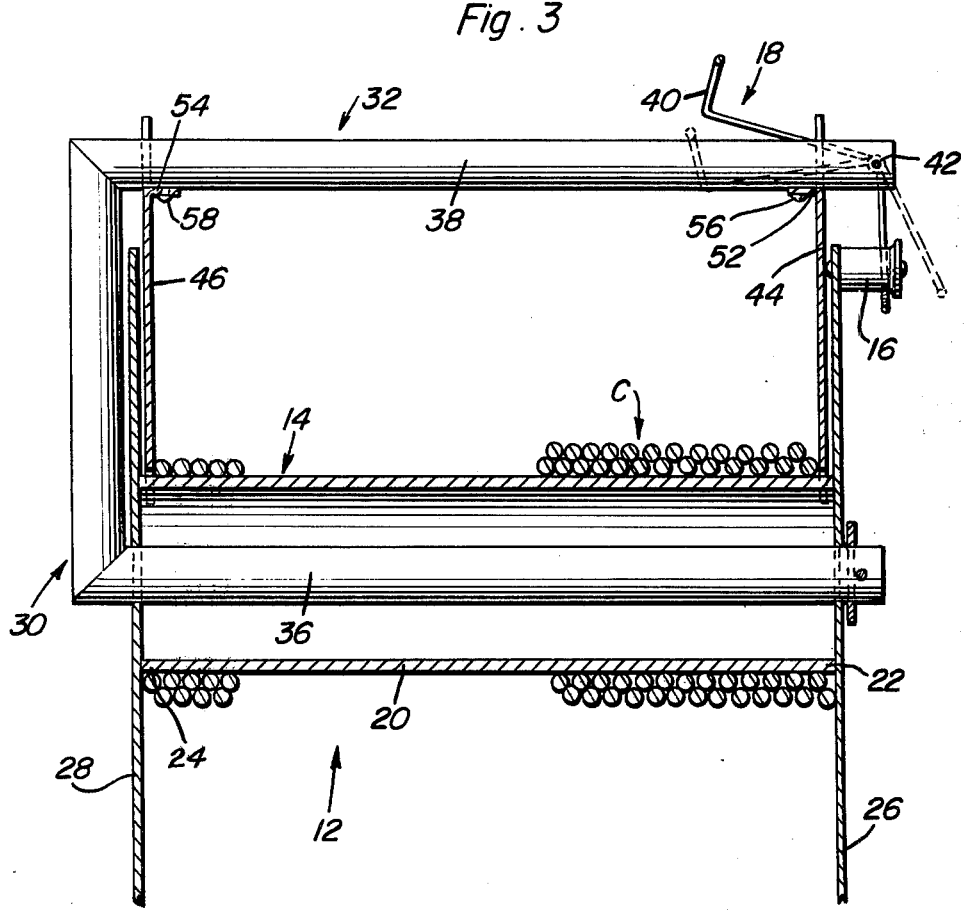
FIG. 3 is a sectional view taken generally along the line 3—3 of FIG. 2.
Figure 4:
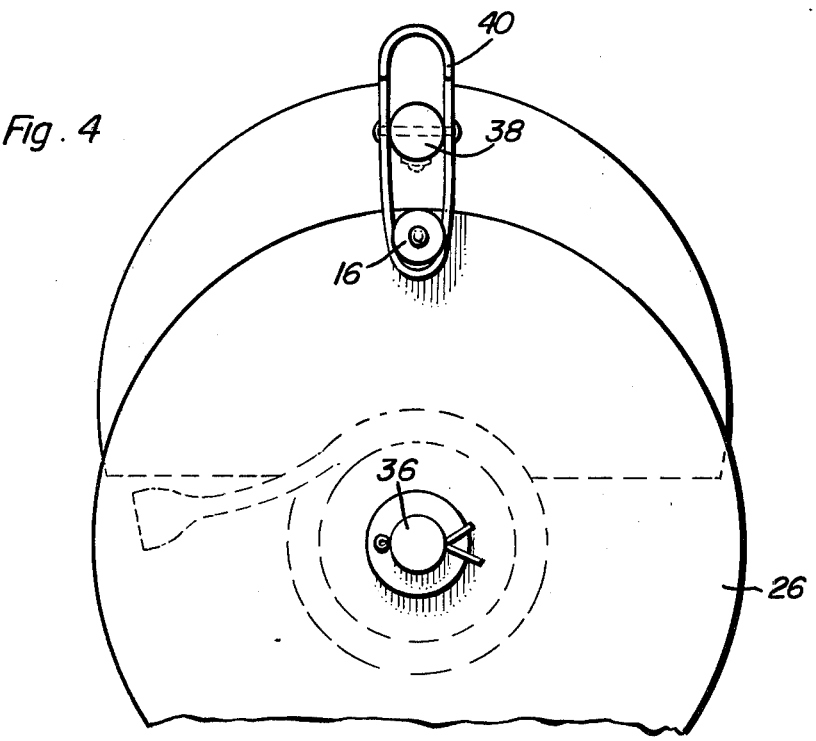
FIG. 4 is a fragmentary, end view looking from the right in FIG. 3.

Referring now more particularly to the figures of the drawings, a cord reel 10 according to the present invention is shown as including a spool assembly 12 partially formed by a spool 14 in the form of a longitudinally extending cylinder provided with a axial bore and rotatably mounted for winding and unwinding a cord C. A knob 16 is also included in the spool assembly 12 for rotating spool 14 in a manner to become clear below, while a latch arrangement 18 is provided on spool assembly 12 as well for selectively engaging with knob 16 and preventing rotation of spool 14 so as to keep cord C from unwinding from spool 14 except as desired.

Spool 14 has a winding surface 20 of generally cylindrical configuration and terminating in and extending between spaced ends 22 and 24 of spool 14. A plate 26, preferably in the form of the illustrated disk, is mounted on spool 14 at end 22 thereof, with knob 16 being mounted on plate 26 and spaced from the bore through spool 14, which bore forms the axis of rotation of spool 14, in order to cause plate 26 to form a crank in conjunction with knob 16.

A further plate 28, which is preferably similar in configuration to plate 26, is attached to end 24 of spool 12, with the winding surface 20, plate 26, and plate 28 cooperating with one another to form an open winding drum.

The spool assembly 12 also includes a substantially U-shaped framework 30 comprising a pair of legs 32 extending substantially parallel to one another and joined together as by a suitable side portion 34. One of the legs 32 forms a spindle 36 which rotatably receives spool 14, while the other of the legs 32 forms a handle 38 for facilitating carrying and manipulation of the cord reel 10. Spool 14 is retained on spindle 36 in a conventional manner, such as by the use of the illustrated cotter pin.

Latch arrangement 18 includes a loop 40 constructed from a length of semi-rigid wire, and the like, which is inserted in a hole 42 provided in handle 38 and arranged near the free end of the leg forming handle 38 such that loop 40 can be selectively arranged engaging the knob 16. By such engagement, it will be appreciated that knob 16 will be prevented from orbiting so as to rotate spool 14, and that spool 14 will be locked against rotation so as to retain cord C on the reel 10, as desired.

Spool assembly 12 also advantageously includes guides 44 and 46 which can be in the illustrated semicircular configuration and which are arranged overlapping the upper portions of the plates 26, 28 adjacent the ends 22, 24 of spool 14. More specifically, the guides 44, 46 can be provided with arcuate cut-out portions along the lower, straight edges thereof in order to fit over the winding surface 20 of spool 14 at respective ends 22, 24 of the spool 14. The upper arcuate portions of guides 44, 46 are provided with respective recesses 48, 50 which receive the handle 38, and which have associated therewith right-angle lugs 52, 54 which cooperate with conventional screws 56 and 58 to fasten the guides 44, 46 to handle 38. Thus provided, the guides 44, 46 prevent cord C from rolling over the peripheral edge portions of plates 26, 28.

Spool assembly 12 still further includes an attachment arrangement in the form of a conventional bracket 60 provided with an arcuate median portion defined by flanges provided with apertures for receiving conventional screws 62, 64 or other suitable fasteners in order to mount bracket 60 on spool 14. More specifically, bracket 60 is mounted on the winding surface 20 of spool 14 at a point substantially midway between the ends 22, 24 of the spool 14, and functions to clamp the center of the longitudinal extent of cord C to winding surface 20 for permitting each portion of cord C extending from the bracket 60 to be wound equally on winding surface 20.

As can be appreciated from the above description and from the drawings, cord C may be rolled in either direction by right or left handed persons, and since the end portions of cord C are equal in length due to the central attachment of cord C on winding surface 20 by bracket 60, only the length of cord C needed for a particular job need be unrolled from reel 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cord reel, comprising, in combination:
   a. spool means including a substantially U-shaped framework, and a spool rotatably mounted on the framework for winding and unwinding a cord; and
   b. rotating means connected to the spool means for rotating the spool, the spool having a pair of spaced ends and a winding surface terminating in and extending between the ends of the spool, a plate mounted on the spool at one of the ends of the spool, and the rotating means including a knob mounted on the plate, the spool having an axis of rotation and the knob being spaced from the axis of rotation so that the plate and knob form a crank for rotating the spool, the spool means further including a further plate similar to the plate on which the knob is mounted and attached to the spool at the other of the ends of the spool, the winding surface, plate and further plate forming an open winding drum, the spool means still further including guides overlapping the plate and further plate and attached to the framework for preventing the cord wound on the winding surface of the spool from rolling over the plates.

2. A structure as defined in claim 1, wherein the spool means further includes attachment means provided on the spool for fastening a center portion of the cord to the spool, and the attachment means being arranged substantially midway between the ends of the spool for permitting each portion of the cord extending from the attachment means to be wound equally on the spool.

3. A cord reel, comprising, in combination:
   a. spool means including a spool rotatably mounted for winding and unwinding a cord; and
   b. rotating means connected to the spool means for rotating the spool, the spool means including in addition to the spool a substantially U-shaped framework comprising a pair of substantially parallel legs and a side portion connected to the legs adjacent common ends thereof for joining the legs together, with the spool being mounted on one of the legs, and with the other of the legs forming a handle for facilitating carrying and manipulation of the cord reel, the spool means further including the spool having a pair of spaced ends and a winding surface terminating in and extending between the spaced ends of the spool, and a plate mounted on the spool at one of the ends of the spool, and the rotating means including a knob mounted on the plate and spaced from the spindle formed by the framework, with the plate and knob forming a crank for rotating the spool about the spindle, the spool means further including a further plate similar to the plate on which the knob is mounted and attached to the spool at the other of the ends of the spool, the winding surface, plate and further plate forming an opening winding drum, and the spool means still further including guides overlapping the plate and further plate and attached to the handle formed by the framework for preventing the cord wound on the winding surface of the spool from rolling over the plates.

4. A structure as defined in claim 3, further including latch means provided on the spool means for selectively engaging the rotating means and preventing rotation of the spool by the rotating means, with the latch means comprising a loop attached to the handle formed by the framework and arranged for selectively engaging with the knob for preventing rotation of the spool.

5. A structure as defined in claim 3, wherein the spool means further includes attachment means provided on the winding surface of the spool for fastening a center portion of the cord to the winding surface, the attachment means being arranged substantially midway between the ends of the spool for permitting each portion of the cord extending from the attachment means to be wound equally on the winding surface of the spool.

* * * * *